US012388221B2

(12) United States Patent
Chang et al.

(10) Patent No.: US 12,388,221 B2
(45) Date of Patent: Aug. 12, 2025

(54) ELECTRICAL CONNECTOR STRUCTURE

(71) Applicant: JESS-LINK PRODUCTS CO., LTD., New Taipei (TW)

(72) Inventors: Hsu-Feng Chang, New Taipei (TW); Yu-Chai Yeh, New Taipei (TW); Yi-Lun Hsiao, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 297 days.

(21) Appl. No.: 18/223,014

(22) Filed: Jul. 17, 2023

(65) Prior Publication Data

US 2024/0413588 A1 Dec. 12, 2024

(30) Foreign Application Priority Data

Jun. 6, 2023 (TW) ................................ 112121027

(51) Int. Cl.
*H01R 13/6585* (2011.01)
*H01R 13/6597* (2011.01)

(52) U.S. Cl.
CPC ..... *H01R 13/6585* (2013.01); *H01R 13/6597* (2013.01)

(58) Field of Classification Search
None
See application file for complete search history.

(56) References Cited

U.S. PATENT DOCUMENTS 9,640,923 B2 * 5/2017 Kao ........................ H01R 24/60

FOREIGN PATENT DOCUMENTS

CN 212062870 U * 12/2020
TW M645161 U 8/2023

OTHER PUBLICATIONS

Office Action dated Jan. 26, 2024 of the corresponding Taiwan patent application No. 112121027.

* cited by examiner

*Primary Examiner* — Tho D Ta
(74) *Attorney, Agent, or Firm* — Chun-Ming Shih; HDLS IPR SERVICES

(57) ABSTRACT

An electric connector structure includes a base, a tongue piece, a shielding case, a first terminal row, a second terminal row, a middle partition, a first shielding sheet and a second shielding sheet. The shielding case sheathes the base and the tongue. The first terminal row and the second terminal row are disposed on two distal surfaces of the tongue piece. The middle partition is disposed in the tongue piece. The first shielding sheet has a first terminal elastic arm extended toward and abutting against the first terminal row, and a first case elastic arm extended toward and abutting against the shielding case. The second shielding sheet has a second terminal elastic arm extended toward and abutting against the second terminal row, and a second case elastic arm extended toward and abutting against the shielding case. Accordingly, interferences of the electromagnetic wave and the crosstalk are improved.

9 Claims, 9 Drawing Sheets

ELECTRICAL CONNECTOR STRUCTURE

BACKGROUND OF THE DISCLOSURE

Technical Field

The present disclosure relates to an electrical connector structure, especially to an electrical connector structure which is easy to be assembled and provided with an advantage of having a high stability during the high-frequency and high-speed transmission.

Description of Related Art

A related-art electrical connector, for example a RJ45 connector, a USB connector or a Display-Port connector, is commonly used in various communication devices to provide a function of transferring an electrical signal and serving as a connection bridge. When the electrical connector is used for retransferring a high-frequency signal, interferences of the electromagnetic wave and the crosstalk are generated, the stability of transferring the current and the signal is affected, thus a middle partition arranged between dual terminal rows of the related-art electrical connector is disposed with a protrusion or a convex block used for abutting against a grounding terminal and a shielding case. As such, the aforesaid problems are avoided.

However, when the conductive terminal and the middle partition are distanced from the shielding case, the middle partition is required to be prolonged to abut against the shielding case, thus the production is complicated and the stability and the strength of the whole structure may easily have problems. Moreover, the related-art middle partition is mounted inside a tongue piece with an injection mounting manner. As such, a new mold has to be provided when the product design is changed or the dimension is slightly adjusted, thus the production procedure is complicated and the production cost is high.

Accordingly, the applicant of the present disclosure has devoted himself for improving the mentioned shortages.

SUMMARY OF THE DISCLOSURE

The present disclosure is to provide an electric connector structure, which has advantages of improving interference of the electromagnetic wave and the crosstalk to increase the stability during the high-frequency and high-speed transmission, and being easy to be assembled to simplify the production procedure and save the production cost.

Accordingly, the present invention provides an electric connector structure, which includes an insulation body, a shielding case, a first terminal row, a second terminal row, a middle partition, a first shielding sheet and a second shielding sheet. The insulation body has a base and a tongue piece. The base has a front end and a rear end. The tongue piece is extended out from the front end. The tongue piece has a first distal surface and a second distal surface oppositely arranged. The shielding case sheathes the insulation body. The first terminal row is inserted in the insulation body from the rear end and disposed on the first distal surface. The first terminal row has a plurality of first grounding terminals. The second terminal row is inserted in the insulation body from the rear end and disposed on the second distal surface. The second terminal row has a plurality of second grounding terminals. The middle partition is accommodated in the tongue piece and located between the first terminal row and the second terminal row. The first shielding sheet is inserted in the base and located between the first terminal row and the shielding case. The first shielding sheet has a plurality of first terminal elastic arms and a first case elastic arm. Each of the first terminal elastic arms is extended from the first shielding sheet toward the first terminal row and abuts against each of the first grounding terminals. The first case elastic arm is extended from the first shielding sheet toward the shielding case and abuts against the shielding case. The second shielding sheet is inserted in the base and located between the second terminal row and the shielding case. The second shielding sheet has a plurality of second terminal elastic arms and a second case elastic arm. Each of the second terminal elastic arms is extended from the second shielding sheet toward the second terminal row and abuts against each of the second grounding terminals. The second case elastic arm is extended from the second shielding sheet toward the shielding case and abuts against the shielding case.

According to one embodiment of the present disclosure, the first shielding sheet has a partition elastic arm, and the partition elastic arm is extended from the first shielding sheet toward the middle partition and abuts against the middle partition.

According to one embodiment of the present disclosure, the base has a first accommodating slot and a first positioning slot, the first shielding sheet has a first positioning sheet, the first shielding sheet is accommodated in the first accommodating slot, and the first positioning sheet is inserted and positioned in the first positioning slot.

According to one embodiment of the present disclosure, there are three first positioning slots and three first positioning sheets, wherein one of the first positioning slots and the other two first positioning slots are disposed at two opposite sides of the first accommodating slot, one of the first positioning sheets and the other two first positioning sheets are disposed at two opposite sides of the first shielding sheet, each of the first positioning sheets is inserted and positioned in each of the first positioning slots.

According to one embodiment of the present disclosure, the base has a second accommodating slot and a second positioning slot, the second shielding sheet has a second positioning sheet, the second shielding sheet is accommodated in the second accommodating slot, and the second positioning sheet is inserted and positioned in the second positioning slot.

According to one embodiment of the present disclosure, the second accommodating slot and the second positioning slot are in communication and adjacently disposed, the base has a block wall arranged between the second accommodating slot and the second positioning slot, and the block wall blocks a lateral surface of the second positioning sheet.

According to one embodiment of the present disclosure, each of the second terminal elastic arms and the second positioning sheet are disposed at two opposite sides of the second shielding sheet.

According to one embodiment of the present disclosure, the base has a flat slot, the flat slot is inwardly extended from the rear end and disposed in the tongue piece, and the middle partition is inserted in the flat slot.

According to one embodiment of the present disclosure, there are a plurality of first case elastic arms, and each of the first case elastic arms and each of the first terminal elastic arms are alternately arranged.

According to one embodiment of the present disclosure, there are a plurality of second case elastic arms, and each of the second case elastic arms and each of the second terminal elastic arms are alternately arranged.

Advantages achieved by the present disclosure are as follows. According to the electrical connector structure of the disclosure, the interference of the electromagnetic wave and the remote crosstalk is effectively improved through each of the first terminal elastic arms and the first case elastic arm of the first shielding sheet respectively abutting against each of the first grounding terminals and the shielding case, and through each of the second terminal elastic arms and the second case elastic arm of the second shielding sheet respectively abutting against each of the second grounding terminals and the shielding case, thus the stability during the high-frequency and high-speed transmission is increased. Moreover, the first terminal row, the first shielding sheet, the second terminal row and the second shielding sheet are inserted and assembled from the rear end of the base, thus the manufacturing procedure does not require the injection molding and mounting process, the assembling production is simplified and the production cost is reduced.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

Figure 1:
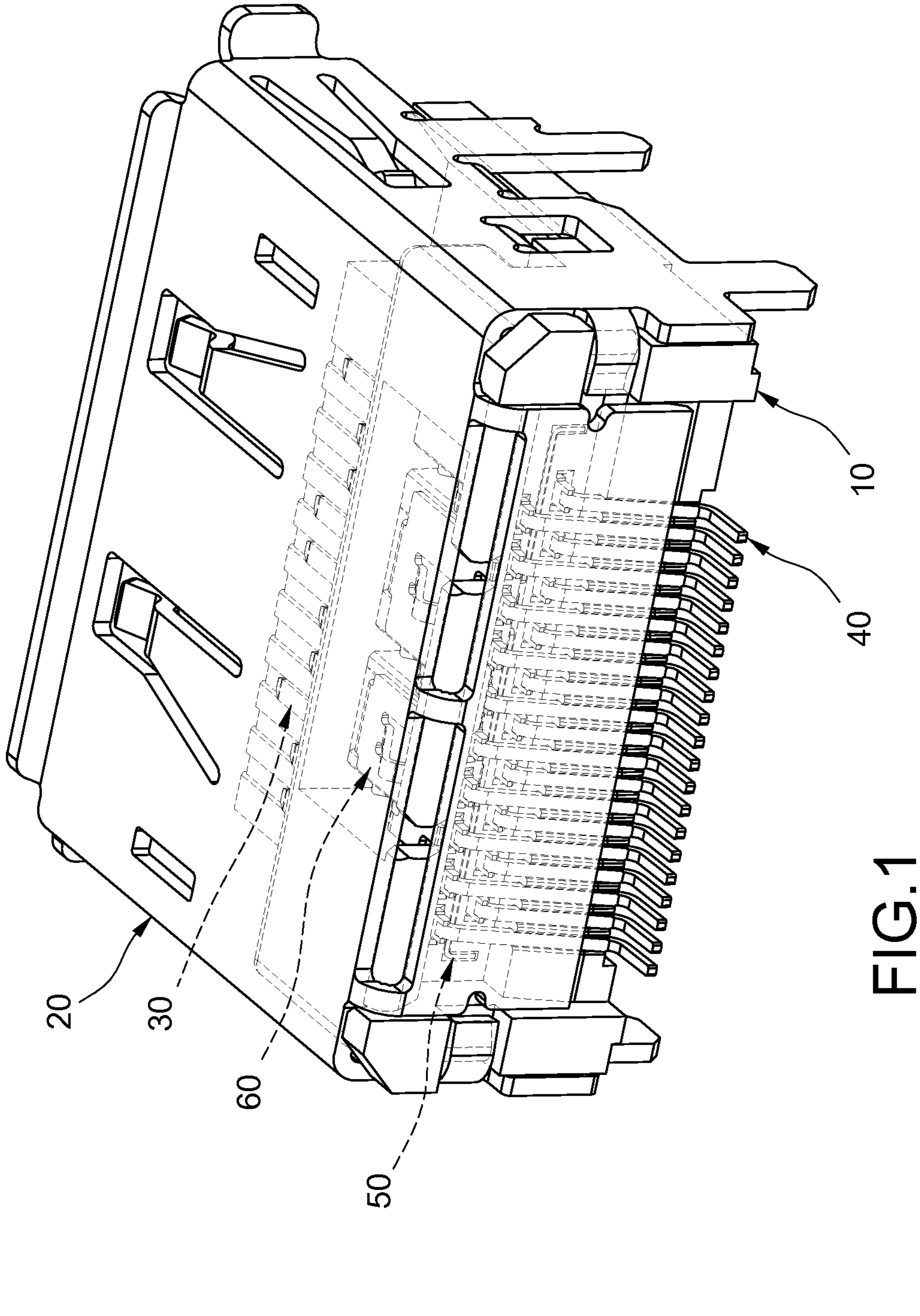
FIG. 1 is a perspective view showing the assembly according to the present disclosure.
Figure 2:
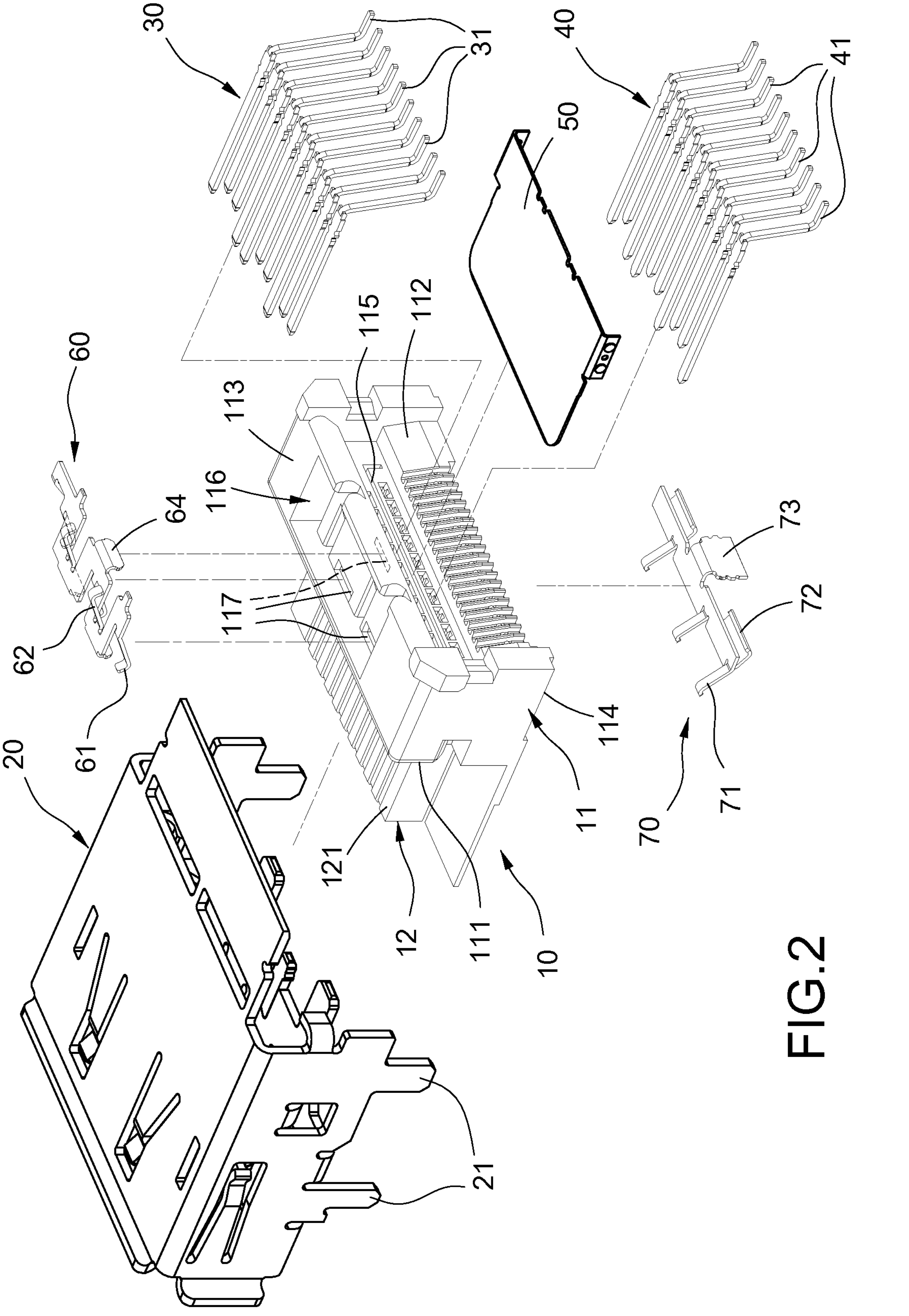
FIG. 2 is a perspective exploded view according to the present disclosure.
Figure 3:
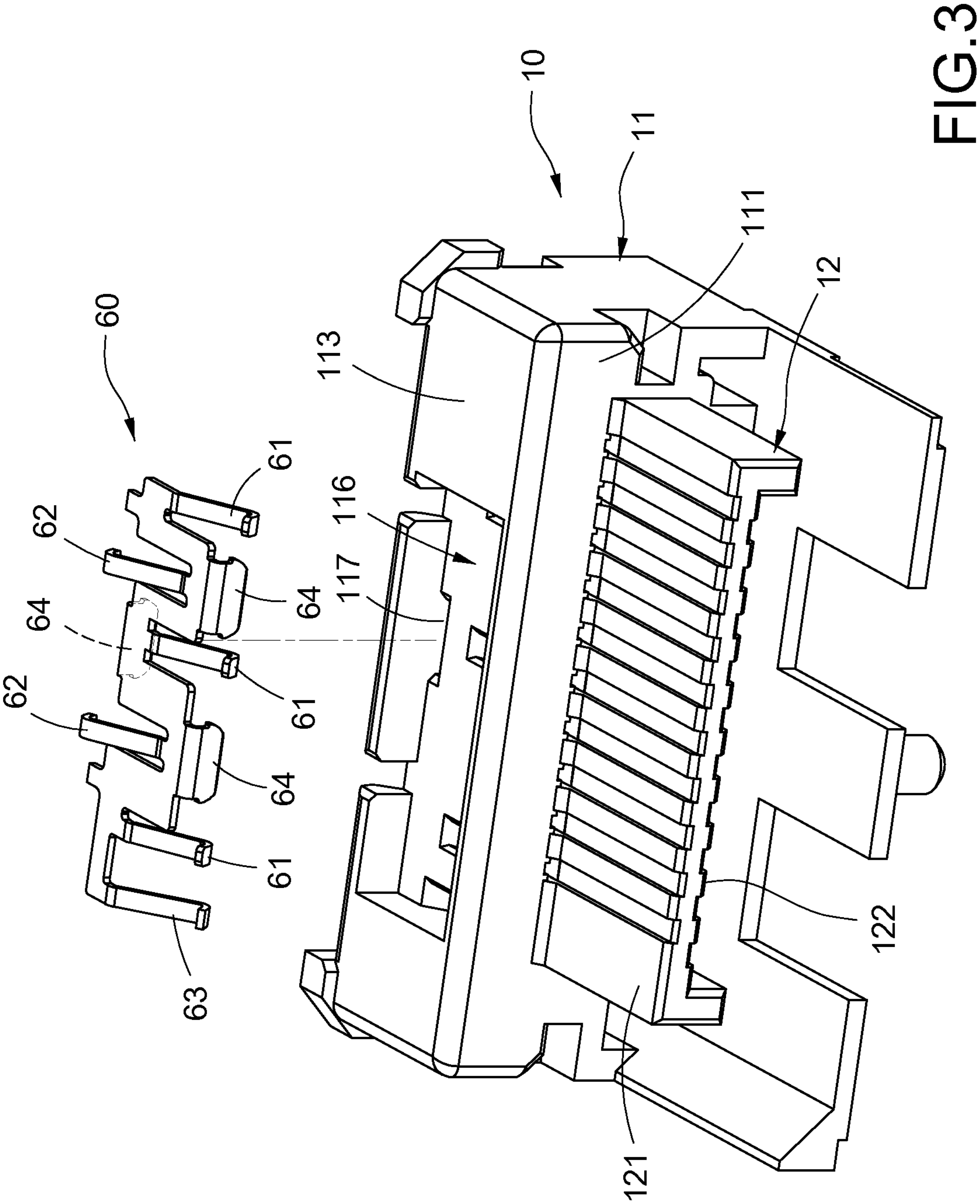
FIG. 3 is a perspective exploded view showing the insulation body and the first shielding sheet according to the present disclosure.

It is to be understood that the terms for indicating positions and the location relation, for example "front", "rear", "left", "right", "front end", "rear end", "distal end", "vertical", "horizontal", "top end" and "bottom end", are based on the positions and the location relation disclosed in the drawings, and only used for disclosing the present disclosure and not used for indicating or implying the specified location of the device or the components or the specified structure and operation in certain location, thus the present disclosure is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer or the part. Unless being clearly indicated according to the whole specification, the terms for example "the first", "the second", "the third", "the fourth" and "the fifth" are not used for implying the order or sequence.

The technical contents of this disclosure will become apparent with the detailed description of embodiments accompanied with the illustration of related drawings as follows. It is intended that the embodiments and drawings disclosed herein are to be considered illustrative rather than restrictive.

The present disclosure provides an electrical connector structure. Please refer to FIG. 1 to FIG. 5, the electrical connector structure includes an insulation body 10, a shielding case 20, a first terminal row 30, a second terminal row 40, a middle partition 50, a first shielding sheet 60 and a second shielding sheet 70.

In some embodiments, the insulation body 10 is formed by a plastic injection molding manner to be in a one-piece form (or integrally formed), here is not intended to be limiting. For example, the insulation body 10 may be made of other insulation materials. The insulation body 10 includes a base 11 and a tongue piece 12. The base 11 has a front end 111 and a rear end 112 oppositely arranged with a forward/backward manner, and a top part 113 and a bottom part 114 oppositely arranged with an upward/downward manner. The tongue piece 12 is extended from the front end 111 of the base 11. The tongue piece 12 has a first distal surface 121 and a second distal surface 122 oppositely arranged with an upward/downward manner. In some embodiments, the first distal surface 121 is located above the tongue piece 12, and the second distal surface 122 is located below the tongue piece 12. In some other embodiments, the first distal surface 121 may be located below the tongue piece 12, and the second distal surface 122 may be located above the tongue piece 12. The base 11 has a flat slot 115. The flat slot 115 is inwardly extended from the rear end 112 and disposed in the tongue piece 12.

The shielding case 20 is made of a metal material, for example copper, brass, nickel, silver, steel, tin or an alloy thereof, here is not intended to be limiting. The shielding case 20 sheathes an outer side of the insulation body 10. In some embodiments, the shielding case 20 covers a top side, a bottom side, a left side, and a right side of the insulation body 10, thus a front end and a rear end of the insulation body 10 are exposed to make a pair of connectors (not shown in figures) be inserted, and make terminal feet be soldered on a circuit board (not shown in figures). The shielding case 20 has a plurality of soldering feet 21 arranged at a left side and a right side of the bottom part 114 and capable of being soldered on the circuit board.

The first terminal row 30 is inserted in the insulation body 10 from the rear end 112 of the base 11, and disposed on the first distal surface 121 of the tongue piece 12. In some embodiments, the first terminal row 30 may be disposed on the second distal surface 122 of the tongue piece 12. The first terminal row 30 includes a plurality of first grounding terminals 31, a plurality of first power terminals and a plurality of first signal terminals. Each of the first grounding terminals 31, each of the first power terminals and each of the first signal terminals are made of an electrical conducting material.

The second terminal row 40 is inserted in the insulation body 10 from the rear end 112 of the base 11, and disposed on the second distal surface 122 of the tongue piece 12. In some embodiments, the second terminal row 40 may be disposed on the first distal surface 122 of the tongue piece 12. The second terminal row 40 includes a plurality of second grounding terminals 41, a plurality of second power terminals and a plurality of second signal terminals. Each of the second grounding terminals 41, each of the second power terminals and each of the second signal terminals are made of an electrical conducting material.

The middle partition 50 is made of a metal material, for example copper, brass, nickel, silver, steel, tin or an alloy thereof, here is not intended to be limiting. The middle partition 50 is disposed in the tongue piece 12 and located between the first terminal row 30 and the second terminal row 40. In some embodiments, the middle partition 50 is inserted in the flat slot 115 from the rear end 112 of the base 11. As such, an electromagnetic shielding effect is provided between the first terminal row 30 and the second terminal row 40, and signals between the first terminal row 30 and the second terminal 40 are prevented from being interfered.

The first shielding sheet 60 is made of a metal material, for example copper, brass, nickel, silver, steel, tin or an alloy thereof, here is not intended to be limiting. The first shielding sheet 60 is inserted in the base 11 and disposed between the first terminal row 30 and the shielding case 20. In some embodiments, the first shielding sheet 60 is inserted in the top part 113 of the base 11, in other words the first shielding sheet 60 is located above the first terminal row 30. In some embodiments, the first shielding sheet 60 may be inserted in the bottom part 114 of the base 11. The first shielding sheet 60 has a plurality of first terminal elastic arms 61 and a first case elastic arm 62. Each of the first terminal elastic arms 61 is inclined and extended from the first shielding sheet 60 toward the first terminal row 30 and elastically abuts against each of the first grounding terminals 31 to form an electric connection, in other words each of the first terminal elastic arms 61 is downwardly inclined and extended to the first terminal row 30 to elastically abut against each of the first grounding terminals 31. The first case elastic arm 62 is inclined and extended from the first shielding sheet 60 toward the shielding case 20 and elastically abuts against the shielding case 20 to form an electric connection, in other words the first case elastic arm 62 is upwardly inclined and extended to elastically abut against an inner wall of the top part 113 of the shielding case 20.

The second shielding sheet 70 is made of a metal material, for example copper, brass, nickel, silver, steel, tin or an alloy thereof, here is not intended to be limiting. The second shielding sheet 70 is inserted in the base 11 and disposed between the second terminal row 40 and the shielding case 20. In some embodiments, the second shielding sheet 70 is inserted in the bottom part 114 of the base 11, in other words the second shielding sheet 70 is located below the second terminal row 40. In some embodiments, the second shielding sheet 70 may be inserted in the top part 113 of the base 11. The second shielding sheet 70 has a plurality of second terminal elastic arms 71 and a second case elastic arm 72. Each of the second terminal elastic arms 71 is inclined and extended from the second shielding sheet 70 toward the second terminal row 40 and elastically abuts against each of the second grounding terminals 41 to form an electric connection, in other words each of the second terminal elastic arms 71 is upwardly inclined and extended to the second terminal row 40 to elastically abut against each of the second grounding terminals 41. The second case elastic arm 72 is inclined and extended from the second shielding sheet 70 toward the shielding case 20 and elastically abuts against the shielding case 20 to form an electric connection, in other words the second case elastic arm 72 is downwardly inclined and extended to elastically abut against an inner wall of the bottom part 114 of the shielding case 20.

Accordingly, each of the first grounding terminals 31 of the first terminal row 30 abuts against each of the first terminal elastic arms 61 of the first shielding sheet 60, and abuts against the shielding case 20 through the first case elastic arm 62 of the first shielding sheet 60. Each of the second grounding terminals 41 of the second terminal row 40 abuts against each of the second terminal elastic arms 71 of the second shielding sheet 70, and abuts against the shielding case 20 through the second case elastic arm 72 of the second shielding sheet 70. As such, interferences of the electromagnetic wave and the crosstalk generated by the first terminal row 30 and the second terminal row 40 are transferred to the soldering feet 21 of the shielding case 20 and the circuit board, thus the stability during the high-frequency and high-speed transmission is increased.

Details are provided as follows. Please refer to FIG. 3 and FIG. 5, the first shielding sheet 60 has a partition elastic arm 63. The partition elastic arm 63 is inclined and extended from one side of the first shielding sheet 60 toward the middle partition 50 to elastically abut against the middle partition 50 to form an electric connection, in other words the partition elastic arm 63 is downwardly inclined and extended and abuts against the middle partition 50. As such, the electromagnetic wave shielding generated by the middle partition 50 is transferred to the circuit board sequentially through the partition elastic arm 63, the first shielding sheet 60, the first case elastic arm 62, the shielding case 20 and the soldering feet 21, thus the stability during the high-frequency and high-speed transmission is effectively increased.

Please refer to FIG. 2, FIG. 3, FIG. 6, and FIG. 8, the top part 113 of the base 11 has a first accommodating slot 116 and at least one first positioning slot 117. The first shielding sheet 60 has at least one first positioning sheet 64. The amount of the first positioning sheet 64 is corresponding to the amount of first positioning slot 117. The first positioning sheet 64 is bent and extended out from the first shielding sheet 60. The first shielding sheet 60 is accommodated in the first accommodating slot 116. The first positioning sheet 64 is inserted and positioned in the first positioning slot 117. In some embodiments, there are three first positioning slots 117 and three first positioning sheets 64, here is not intended to be limiting. For example, the amount of the first positioning slot 117 and the amount of the first positioning sheet 64 are two, or equal to or more than four. In some embodiments, one of the first positioning slots 117 and the other two first positioning slots 117 are disposed at two opposite sides of the first accommodating slot 116, one of the first positioning sheets 64 and the other two first positioning sheets 64 are disposed at two opposite sides of the first shielding sheet 60. As such, each of the first positioning sheets 64 is inserted and positioned in each of the first positioning slots 117, thus the first shielding sheet 60 is fastened in the first accommodating slot 116.

Figure 4:
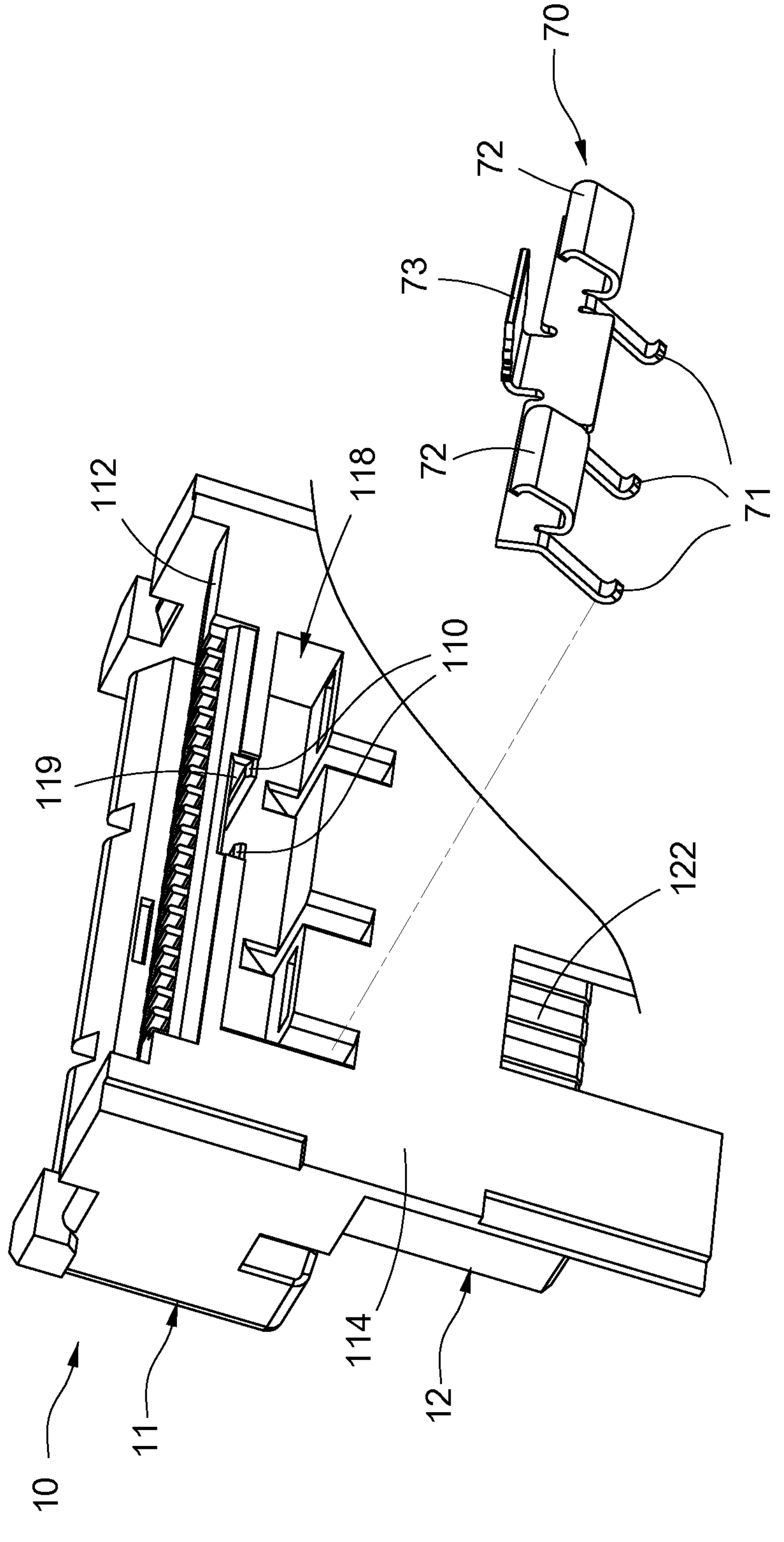
FIG. 4 is a perspective exploded view showing the insulation body and the second shielding sheet according to the present disclosure.
Figure 5:
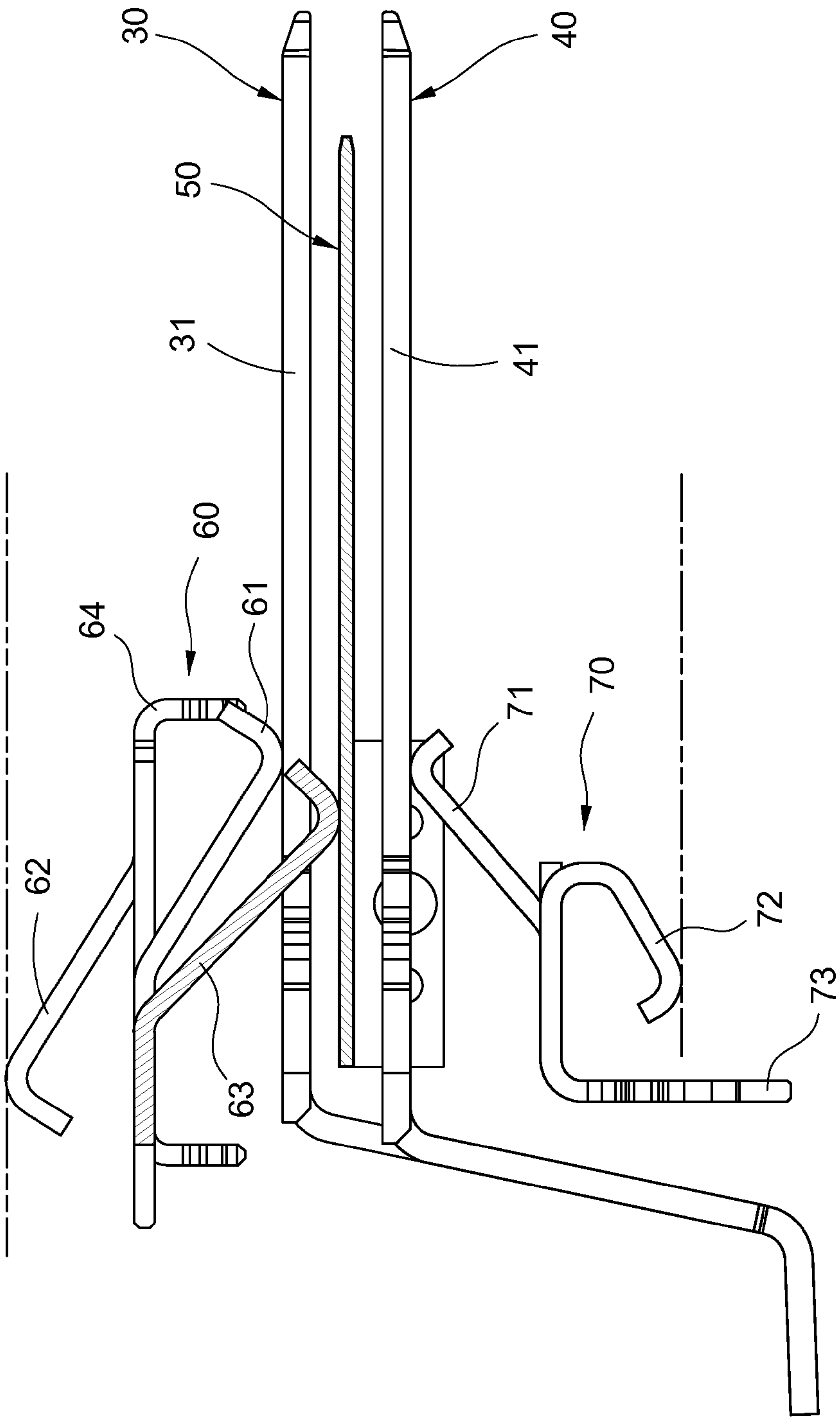
FIG. 5 is a side cross-sectional view showing the first shielding sheet, the second shielding sheet, the first terminal bus, the second terminal bus and the middle partition according to the present disclosure.
Figure 6:
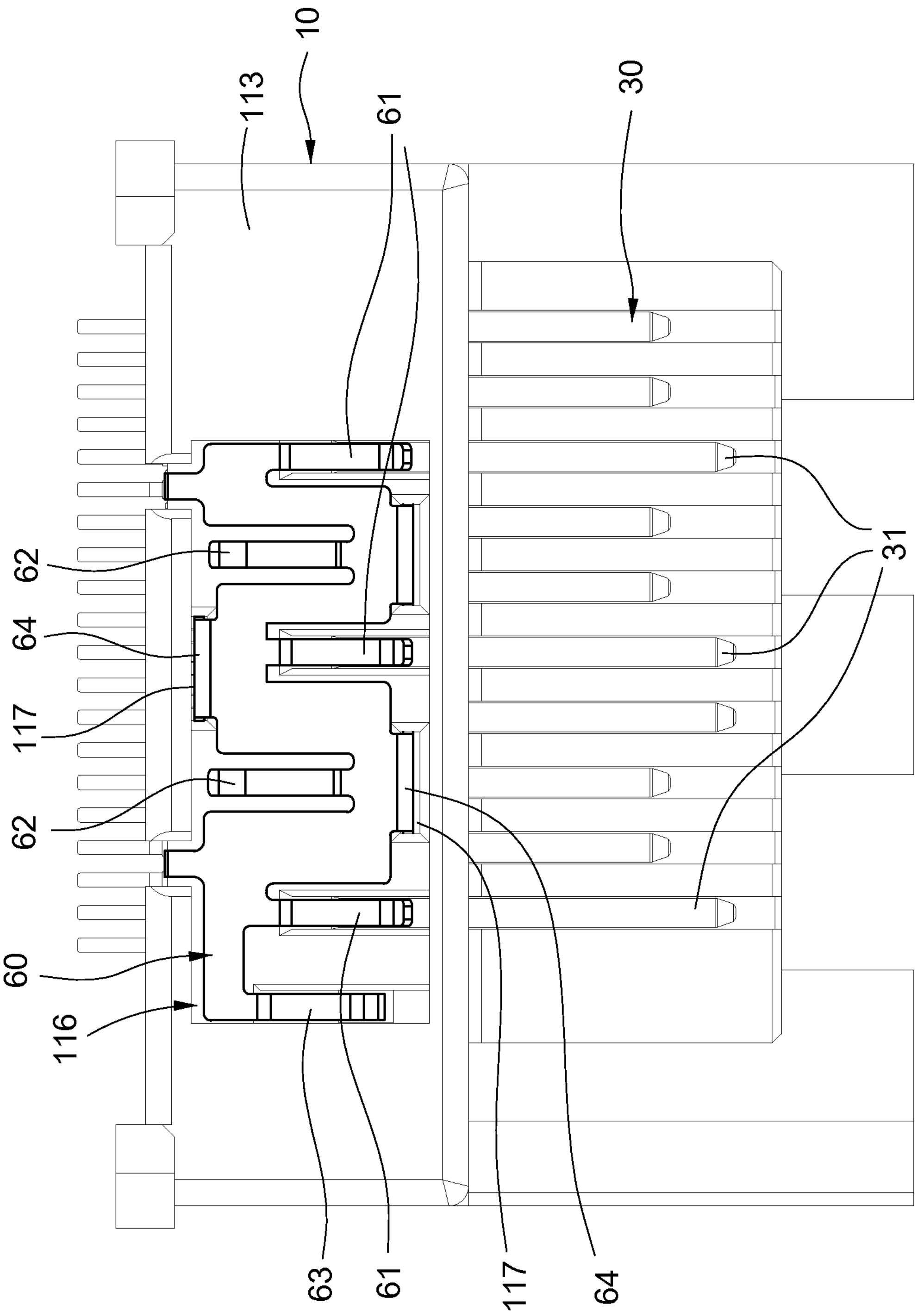
FIG. 6 is a top view showing the shielding case not being disposed according to the present disclosure.
Figure 7:
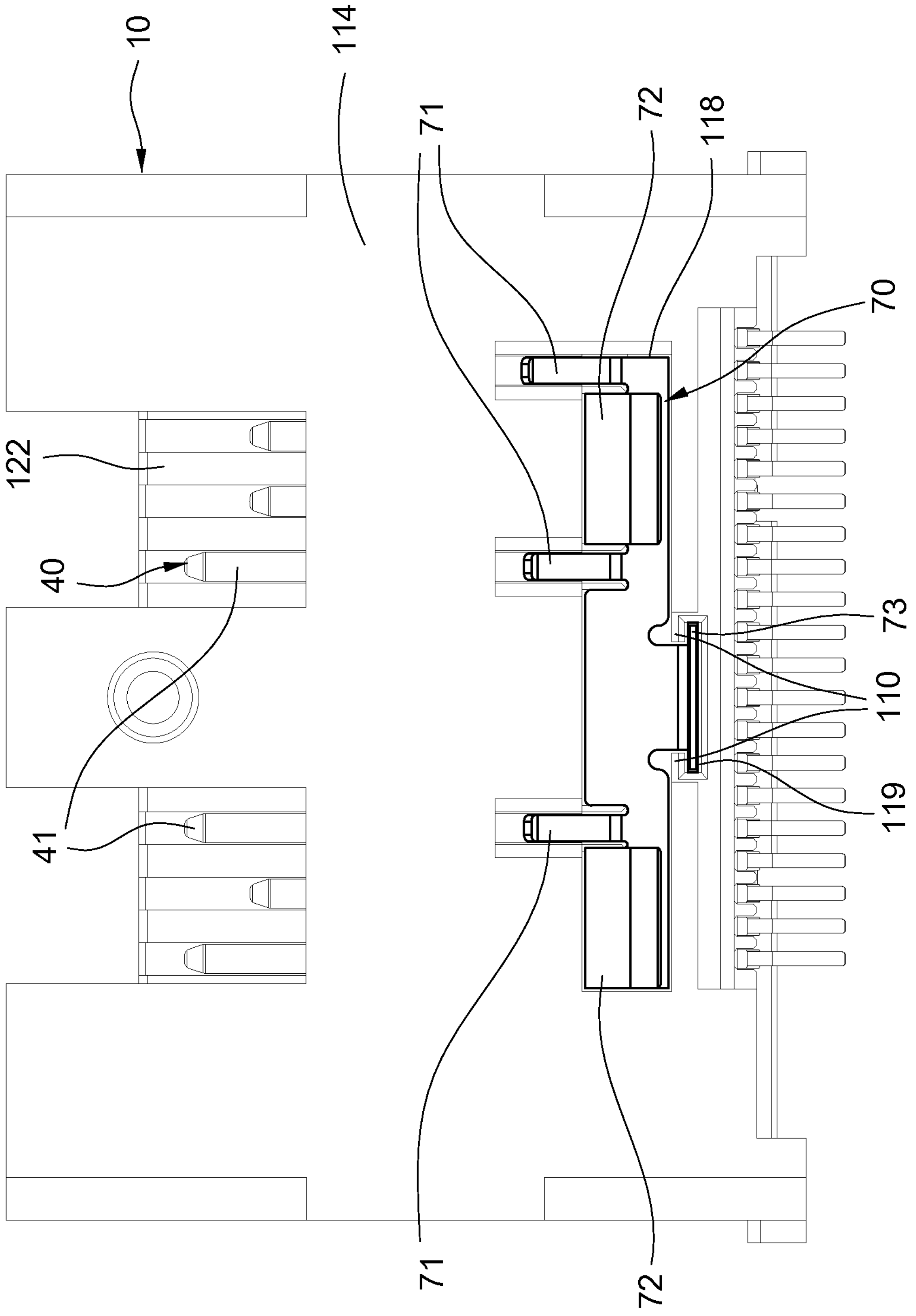
FIG. 7 is a bottom view showing the shielding case not being disposed according to the present disclosure.

Please refer to FIG. 2, FIG. 4, FIG. 7, and FIG. 9, the bottom part 114 of the base 11 has a second accommodating slot 118 and at least one second positioning slot 119. The second shielding sheet 70 has at least one second positioning sheet 73. The amount of the second positioning sheet 73 is corresponding to the amount of second positioning slot 119. The second positioning sheet 73 is bent and extended out from the second shielding sheet 70. The second shielding sheet 70 is accommodated in the second accommodating slot 118. The second positioning sheet 73 is inserted and positioned in the second positioning slot 119. In some embodiments, there is one second positioning slot 119 and one second positioning sheets 73, here is not intended to be limiting. For example, the amount of the second positioning slot 119 and the amount of the second positioning sheet 73 are equal to or more than two. In some embodiments, the second accommodating slot 118 and the second positioning slot 119 are in communication and adjacently disposed. The base 11 is extended with a block wall 110 arranged between the second accommodating slot 118 and the second positioning slot 119. The block wall 110 blocks one lateral surface of the second positioning sheet 73, thus the block wall 110 and the second positioning slot 119 jointly cover the a front side, a rear side, a left side and a right side of the second positioning sheet 73. In some embodiments, there are two block walls 110 which are oppositely arranged as shown in FIG. 4 and FIG. 7, thus an optimal blocking effect is provided to the second positioning sheet 73.

Figure 8:
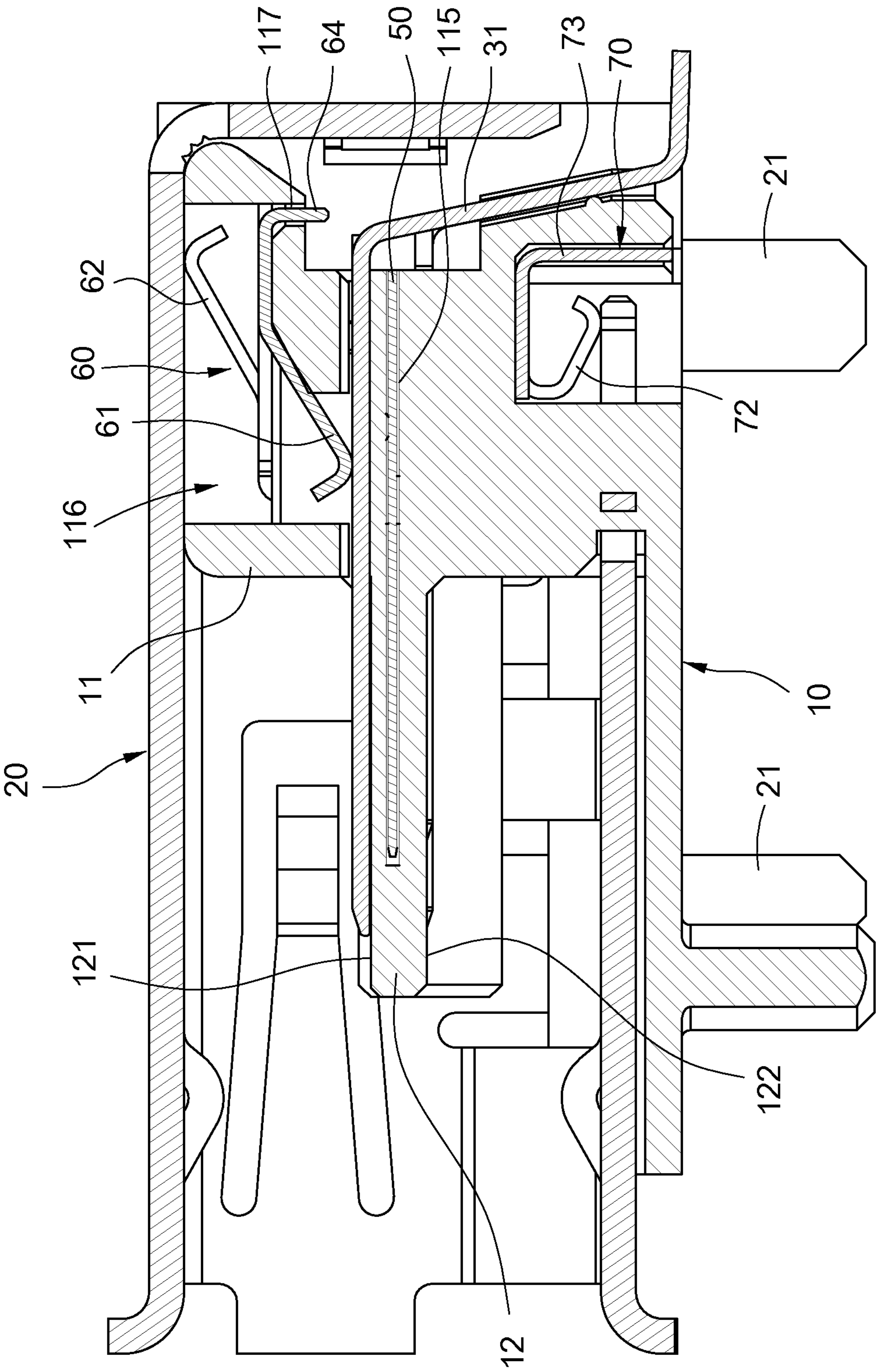
FIG. 8 is a cross-sectional view showing the shielding case not being disposed according to the present disclosure.
Figure 9:
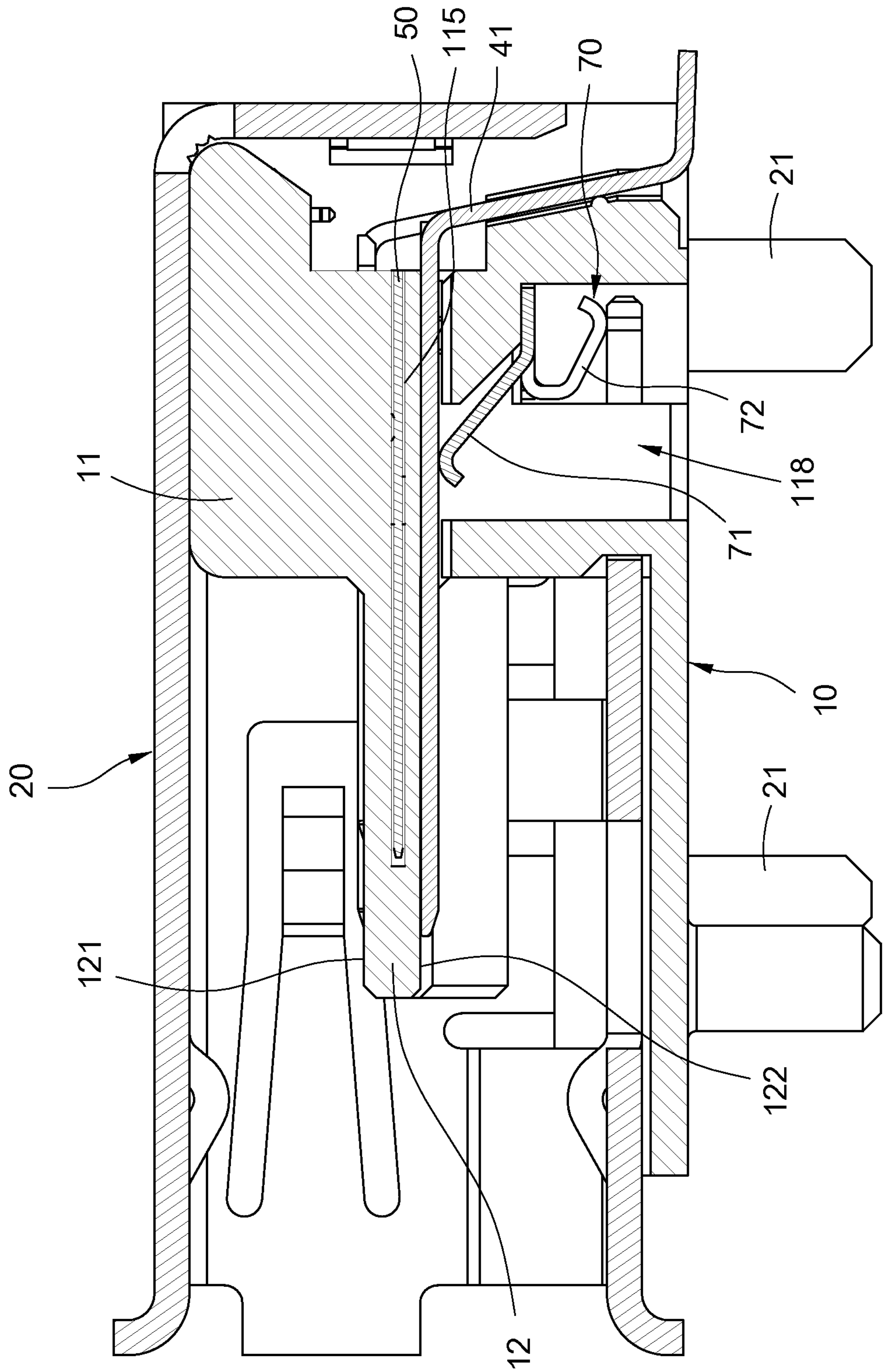
FIG. 9 is another cross-sectional view showing the shielding case not being disposed according to the present disclosure.

Please refer to FIG. 4, each of the second terminal elastic arms 71 and the second positioning sheet 73 are disposed at two opposite sides of the second shielding sheet 70. As such, the second positioning sheet 73 is restrained between the block wall 110 and the second positioning slot 119, and the second shielding sheet 70 generates an upward pivotal torque, the second shielding sheet 70 is tightly attached in the second accommodating slot 118, and each of the second terminal elastic arms 71 tightly and correspondingly abuts against each of the second grounding terminals 41, thus the abutting connection between each of the second terminal elastic arms 71 and each of the second grounding terminals 41 is greatly ensured as shown in FIG. 8 and FIG. 9.

Please refer to FIG. 2, FIG. 3, FIG. 4, FIG. 6, and FIG. 7, in some embodiments, there are two first case elastic arms 62 and two second case elastic arms 72, here is not intended to be limiting. Only one of the first case elastic arms 62 and only one of the second case elastic arms 72 may be adopted as long as the transferring effect is achieved. In some embodiments, there are two first case elastic arms 62 and two second case elastic arms 72 adopted to achieve a desirable transferring effect in a limited space, thus the amount of the first case elastic arm 62 and the amount of the second case elastic arm 72 may be equal to or more than two. Each of the first case elastic arms 62 and each of the first terminal elastic arms 61 are alternately arranged. Each of the second case elastic arms 72 and each of the second terminal elastic arms 71 are alternately arranged.

According to the electrical connector structure of the present disclosure, the electric connection is formed through each of the first terminal elastic arms 61 and the first case elastic arm 62 of the first shielding sheet 60 respectively abutting against each of the first grounding terminals 31 and the shielding case 20, and the electric connection is formed through each of the second terminal elastic arms 71 and the second case elastic arm 72 of the second shielding sheet 70 respectively abutting against each of the second grounding terminals 41 and the shielding case 20, the interference of the electromagnetic wave and the remote crosstalk is still effectively improved under a situation of the first terminal row 30, the second terminal row 40 and the middle partition 50 are distanced from the shielding case 20, thus the stability during the high-frequency and high-speed transmission is increased. Moreover, the first terminal row 30, the first shielding sheet 60, the middle partition 50, the second terminal row 40 and the second shielding sheet 70 are inserted and assembled from the rear end 112 of the base 11, thus the manufacturing procedure does not require the injection molding and mounting process, the assembling production is simplified and the production cost is reduced.

While this disclosure has been described by means of specific embodiments, numerous modifications and variations could be made thereto by those skilled in the art without departing from the scope and spirit of this disclosure set forth in the claims.

What is claimed is:

1. An electrical connector structure, comprising:

an insulation body, comprising a base and a tongue piece, wherein the base comprises a front end and a rear end, the tongue piece is extended out from the front end, the tongue piece comprises a first distal surface and a second distal surface oppositely arranged;

a shielding case, adapted to sheathe the insulation body;

a first terminal row, inserted in the insulation body from the rear end and disposed on the first distal surface, and comprising a plurality of first grounding terminals;

a second terminal row, inserted in the insulation body from the rear end and disposed on the second distal surface, and comprising a plurality of second grounding terminals;

a middle partition, accommodated in the tongue piece and located between the first terminal row and the second terminal row;

a first shielding sheet, inserted in the base and located between the first terminal row and the shielding case, comprising a plurality of first terminal elastic arms and a first case elastic arm, wherein each of the first terminal elastic arms is extended from the first shielding sheet toward the first terminal row and abuts against each of the first grounding terminals, and the first case elastic arm is extended from the first shielding sheet toward the shielding case and abuts against the shielding case; and a second shielding sheet, inserted in the base and located between the second terminal row and the shielding case, comprising a plurality of second terminal elastic arms and a second case elastic arm, wherein each of the second terminal elastic arms is extended from the second shielding sheet toward the second terminal row and abuts against each of the second grounding terminals, and the second case elastic arm is extended from the second shielding sheet toward the shielding case and abuts against the shielding case;

wherein the base comprises a flat slot inwardly extended from the rear end and disposed in the tongue piece, and the middle partition is inserted in the flat slot.

2. The electrical connector structure according to claim 1, wherein the first shielding sheet comprises a partition elastic arm, and the partition elastic arm is extended from the first shielding sheet toward the middle partition and abuts against the middle partition.

3. The electrical connector structure according to claim 1, wherein the first case elastic arm is multiple in number, and each of the first case elastic arms and each of the first terminal elastic arms are alternately arranged.

4. The electrical connector structure according to claim 1, wherein the second case elastic arm is multiple in number, and each of the second case elastic arms and each of the second terminal elastic arms are alternately arranged.

5. The electrical connector structure according to claim 1, wherein the base comprises a first accommodating slot and a first positioning slot, the first shielding sheet comprises a first positioning sheet, the first shielding sheet is accommodated in the first accommodating slot, and the first positioning sheet is inserted and positioned in the first positioning slot.

6. The electrical connector structure according to claim 5, wherein a number of the first positioning slot is three and a number of the first positioning sheet is three, one of the first positioning slots and other two first positioning slots are respectively disposed at two sides of the first accommodating slot opposite to each other, one of the first positioning sheets and other two first positioning sheets are respectively disposed at two sides of the first shielding sheet opposite to each other, and each of the first positioning sheets is inserted and positioned in each of the first positioning slots.

7. The electrical connector structure according to claim 1, wherein the base comprises a second accommodating slot and a second positioning slot, the second shielding sheet comprises a second positioning sheet, the second shielding sheet is accommodated in the second accommodating slot, and the second positioning sheet is inserted and positioned in the second positioning slot.

8. The electrical connector structure according to claim 7, wherein the second accommodating slot and the second positioning slot communicates with each other and are adjacently disposed, the base comprises a block wall arranged between the second accommodating slot and the second positioning slot, and the block wall blocks a lateral surface of the second positioning sheet.

9. The electrical connector structure according to claim 7, wherein each of the second terminal elastic arms and the second positioning sheet are disposed at two sides of the second shielding sheet.

* * * * *